United States Patent [19]

Jacomini

[11] Patent Number: 4,890,113
[45] Date of Patent: Dec. 26, 1989

[54] SECOND TIME AROUND CLUTTER CANCELLATION SYSTEM

[75] Inventor: Omar J. Jacomini, Severna Park, Md.

[73] Assignee: Westinghouse Electric Corp., Pittsburgh, Pa.

[21] Appl. No.: 130,706

[22] Filed: Dec. 9, 1987

[51] Int. Cl.⁴ ............................................. G01S 13/54
[52] U.S. Cl. ...................................................... 342/163
[58] Field of Search ............... 342/159, 160, 161, 162, 342/163, 164

[56] References Cited

U.S. PATENT DOCUMENTS

| | | |
|---|---|---|
| 3,787,851 | 1/1974 | Hughes . |
| 3,877,011 | 4/1975 | Holberg et al. . |
| 4,040,057 | 8/1977 | Cross et al. . |
| 4,137,533 | 1/1979 | Briechle et al. . |
| 4,153,899 | 5/1979 | Taylor, Jr. . |
| 4,454,511 | 6/1984 | Peters . |
| 4,495,501 | 1/1985 | Creed . |
| 4,513,288 | 4/1985 | Weathers et al. ..................... 342/201 |
| 4,616,228 | 10/1986 | Giaccari et al. ..................... 342/160 |
| 4,630,052 | 12/1986 | Galati et al. ......................... 342/159 |
| 4,658,255 | 4/1987 | Nakamura et al. ................... 342/91 |
| 4,680,589 | 7/1987 | Bryant et al. ..................... 342/159 X |
| 4,688,044 | 8/1987 | O'Brien ................................ 342/160 |
| 4,713,664 | 12/1987 | Taylor, Jr. ...................... 342/160 X |
| 4,719,466 | 1/1988 | Farina et al. ........................ 342/159 |
| 4,742,353 | 5/1988 | D'Addio et al. ..................... 342/159 |

Primary Examiner—Thomas H. Tarcza
Assistant Examiner—John B. Sotomayor
Attorney, Agent, or Firm—W. G. Sutcliff

[57] ABSTRACT

The present invention provides a system that cancels second time around clutter in a multiple pulse repetition frequency radar system which uses three groups of differently spaced pulses. The system processes returns from a clutter cancellation group of eight pulses from three different concatenated pulse repetition frequency groups, using two pulses from one group, all pulses from a central group and two pulses from a third group. The pulse returns are each multiplied by a different weight and the eight weighted returns are added together and output as the filtered return signal. As the weights of the outer pairs of pulses increase, as compared to the weights of the inner four pulses, the second time around clutter cancellation effects increase and the first time around clutter cancellation effects decrease.

9 Claims, 5 Drawing Sheets

SECOND TIME AROUND CLUTTER CANCELLATION SYSTEM

BACKGROUND OF THE INVENTION

1. Field of the Invention

The present invention is directed to a second time around clutter cancellation system, and, more particularly, to a system that weights return signals from eight different radar pulses from three different pulse repetition frequency pulse groups and accumulates the weighted pulses as the filtered output.

2. Background of the Invention

In radar systems such as an air traffic control radar, ground clutter needs to be eliminated to provide a controller with an accurate picture of the location of various air vehicles. When a radar pulse reflects off an airplane and returns to a radar antenna, the airplane reflection can be accompanied by ground clutter reflections from objects such as large buildings and mountains located within the maximum range of the radar. The ground clutter (first time around clutter) within the maximum range of the radar can be removed by subtracting the return signal of a first pulse from the return signal of a second pulse. The resulting signal generally only includes objects which are in motion and the doppler frequency of the return indicates target velocity. However, when certain atmospheric conditions exist or when the area outside the maximum radar range includes large signal reflectors such as mountains, a reflection from the large reflectors produced by a much earlier pulse can be received. This unexpected return is interpreted as a moving object because there is not a corresponding inverse signal to cancel out the reflection. Such out-of-range reflections are called second time around clutter. Typical first time around clutter cancellation systems simply combine all the pulses with a pulse group, called a pulse repetition frequency group in which each of the transmitted pulses in the group are separated by the same time period or interpulse period, to produce a filtered return by subtracting half the pulses from the other half of the pulses. Even when all the pulses within the group are combined, the second time around clutter can still exist because of late arriving reflections from a previous pulse group. Since second time around clutter will be interpreted as moving objects within radar range, and because of the increased traffic load managed by controllers, it has become necessary to remove the second time around clutter.

SUMMARY OF THE INVENTION

It is an object of the present invention to provide a system which will cancel second time around clutter.

It is also an object of the present invention to provide a system in which first time around clutter cancellation can be appropriately balanced against second time around clutter cancellation.

The above objects can be accomplished by a system that cancels second time around clutter in a multiple pulse repetition frequency radar system. The system processes returns from a group of eight pulses from three different pulse repetition frequency groups. The pulse returns are each multiplied by a different weight and the weighted returns are added together and output as the filtered return signal.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMFNTS

Figure 1:
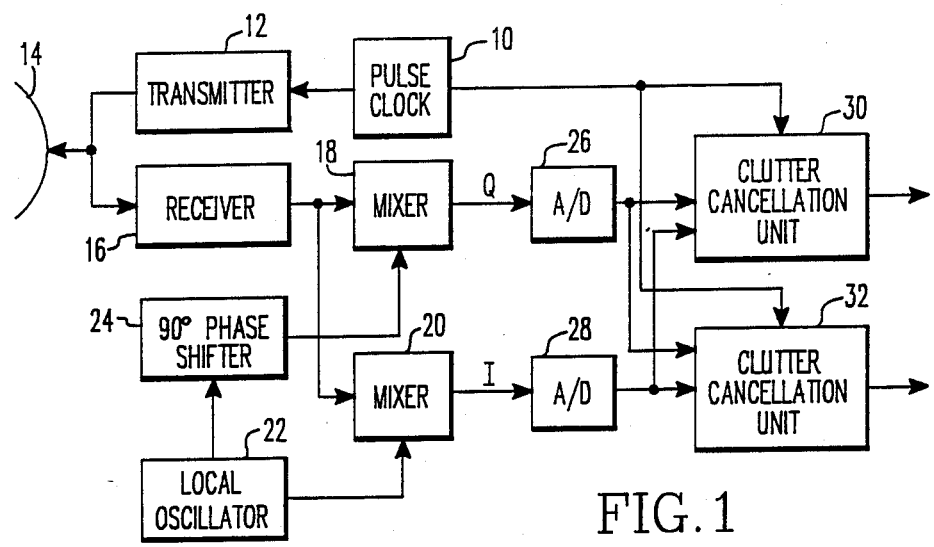
FIG. 1 illustrates the application of the present invention to a conventional radar system.

FIG. 1 illustrates the relationship of the present invention to a portion of a conventional multiple pulse repetition frequency radar system. A pulse clock 10 produces a transmit signal which is converted by a transmitter 12 into a radar pulse output by antenna 14. The antenna 14 receives a return reflection signal and applies the return signal to a receiver 16. The receiver 16 applies the return signal to quadrature and in-phase mixers 18 and 20 which use the output from a local oscillator 22 and phase shifter 24 to produce quadrature and in-phase analog output signals. The analog output signals are applied to analog-to-digital converters 26 and 28 that produce outputs to clutter cancellation units 30 and 32 of the present invention. The outputs of the clutter cancellation units 30 and 32 are typically squared, summed, and applied to a threshold detection unit before being displayed on a cathode ray tube type display.

Figure 2:
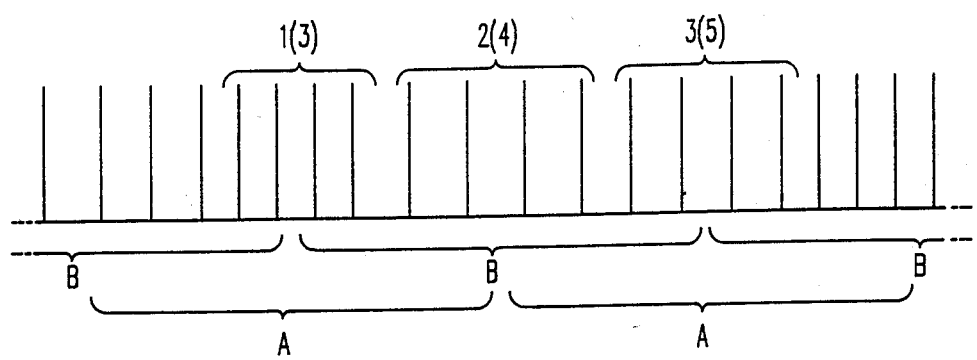
FIG. 2 illustrates the overlapping pulse processing of the present invention used in a multiple pulse repetition frequency radar scheme.
Figure 3:
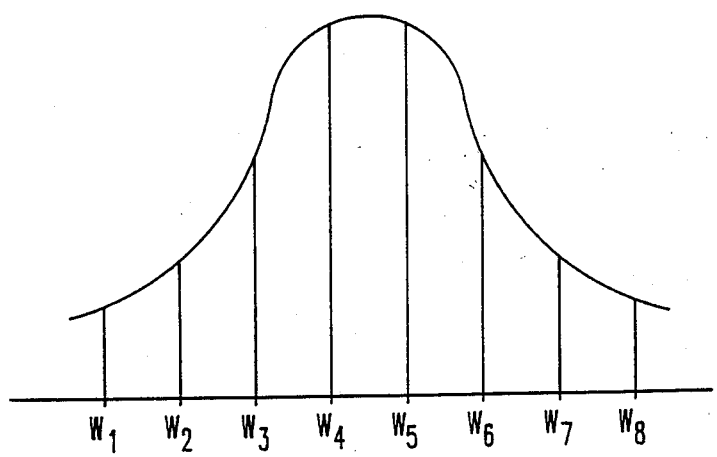
FIG. 3 illustrates the absolute value of the weights applied to the pulses in a processed clutter cancellation group.

In the present invention a multiple pulse repetition frequency pulse modulation scheme is used as depicted in FIG. 2. The pulse modulation scheme consists of three groups of four pulses each, where the spacing between pulses in each group is equal. The pulse repetition frequency ratios used in the preferred scheme are 3, 4 and 5. Eight pulses from the three different pulse repetition frequency groups are processed to produce a single filtered return signal for each of the quadrature and in-phase channels. Four pulses from one group and the last two pulses from a previous group and the first two pulses from a succeeding group are processed as a clutter cancellation group. The pulse groups A and B, illustrated in FIG. 2, are the overlapping clutter cancellation groups processed for the quadrature and in-phase channels. Each of the pulses within a clutter cancellation group are weighted by different weights as illustrated in FIG. 3 which depicts the absolute value of the weights. The weighted return signals are accumulated for the entire clutter cancellation group and output as a clutter cancelled (filtered) return value.

The output produced by the two channels represents the equivalent of two symmetrically positive and negative bandpass filters which are images of each other about zero frequency. When the present invention operates on first time around clutter, it appears like an eight pulse canceller and when it operates on second time around clutter, the first two weighted pulses operate on one batch of clutter, the second four operate on a second batch of clutter and the final two operate on a third batch of clutter, thereby cancelling the clutter from three pulse batches separately.

Figure 4:
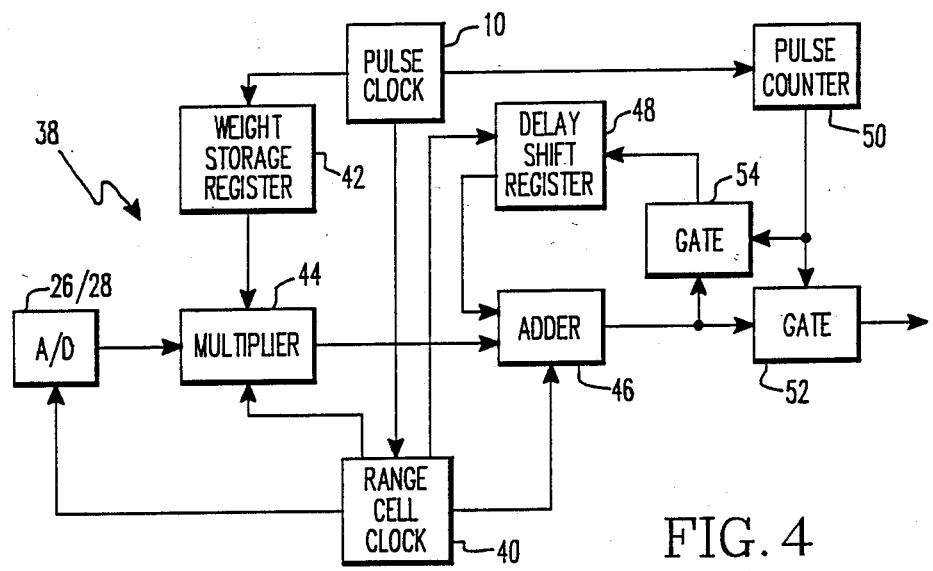
FIG. 4 illustrates a discrete component clutter cancellation device 38.

FIG. 4 illustrates a portion of a discrete component embodiment of the clutter cancellation units 30 and 32 of the present invention formed from known discrete circuits that perform an integrate and dump process. Four devices 38 as depicted in FIG. 4 would be required, one device 38 for each input signal for the clutter cancellation units 30 and 32. In typical radar systems the return signal is divided into range cells (units of time during which a portion of the return signal is processed), where each range cell corresponds to a different distance from the radar antenna 14. In the present invention, the return signal is processed in range cells controlled by a range cell clock 40. The number of range cells into which the smallest interpulse period can be divided is the number of range cells used even when the interpulse period is larger in a different pulse repetition frequency group.

The clock 40 produces a range cell sample signal which causes analog-to-digital converter 26/28 to sample the incoming return signal for the current range cell. Next the clock 40 produces a multiply control signal which causes multiplier 44 to multiply the range cell sample by a weight produced by a weight storage register 42 which can be a ring shift register. The next clock signal, produced during the processing for a single range cell, causes adder 46 to add the weighted range cell sample, produced by the multiplier 44, to a previously accumulated range cell sample value or interim result produced by a delay shift register 48 which can also be a ring shift register. The delay shift register 48 stores an accumulated value for each range cell. The clock 40 then causes the delay shift register 48 to output another (the next) accumulated range cell value at the same time that the output of the adder 46 is stored in the register 48. This multiply and add cycle is repeated for the next range cell and until an updated accumulated range cell value has been produced for all range cells for the current pulse.

After the last range cell, the pulse clock 10 causes register 42 to shift another weight to the output and activate clock 40 to begin performing the range cell accumulation associated with another pulse in the clutter cancellation group. When the eighth pulse is produced indicating the last pulse cycle for range cell accumulation, a pulse counter 50 opens an output gate 52 allowing the accumulated range cells values to be output. The outputs from the two devices 38 of each clutter cancellation unit 30/32 are added together to form a single channel output. The pulse counter 50 also controls a feedback gate 54 which prevents the output of the adder 46 from being applied to the delay shift register 48, thereby clearing the delay shift register 48 during the eighth pulse.

Figure 5:
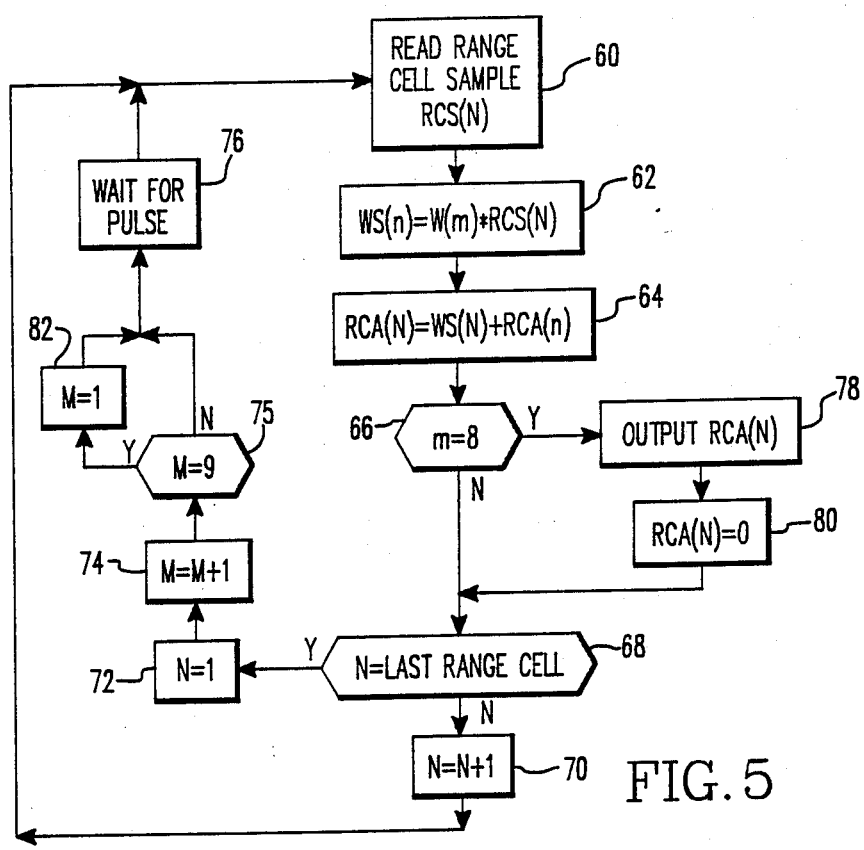
FIG. 5 is a flowchart for the clutter cancellation method when executed in a computer.

It is possible to implement each clutter cancellation device 38 of the present invention in a conventional signal processing computer and the flowchart for an appropriate computer program for each device is illustrated in FIG. 5. In this process the first step is to read 60 a range cell sample RCS(n), where n is the index indicating the current range cell. The range cell sample RCS(n) is then multiplied 62 times the weight W(m), where m is the weight index indicating the current weight, and the result is stored as a weighted range cell sample WS(n). The weighted sample WS(n) is then added 64 to a range cell accumulation value RCA(n) and stored as the range cell accumulated value or interim result RCA(n). If the end of the weights has not been reached 66, the process determines 68 whether the last range cell has been processed. If not, the range cell index n is incremented 70. If the last range cell has been processed, the range cell index n is set 72 to one and the weight index m is incremented 74. If the weight index m is not equal 75 to nine the process waits 76 for the next radar pulse after which the accumulation cycle for range cells occurs again. When the weight index m indicates 66 that the last pulse in the clutter cancellation group is being processed. Each of the range cell accumulated values is output 78, after which the range cell accumulated value is set 80 to zero. After all of the range cells for the last pulse in the clutter cancellation group have been processed, the weight index m is set 82 to one and the cycle for producing the clutter cancelled return signal is started again.

The processes illustrated and described with respect to FIGS. 4 and 5 can also be performed by a pipeline processor in which the stages of the pipeline process correspond to the operation stages described in FIG. 4.

The cancellation of second time around clutter using the process described herein causes the first time around clutter cancellation to be somewhat degraded. Therefore, it is necessary to arrive at an optimum tradeoff for each different application of the present invention. For example, when the radar system is located on flat terrain with relatively small reflectors outside the range of the radar, the second time around clutter cancellation can be reduced to match the small reflectors. In a situation where the radar system includes relatively large reflectors outside the maximum range of the radar, the second time around clutter cancellation must be enhanced.

Figure 6A:
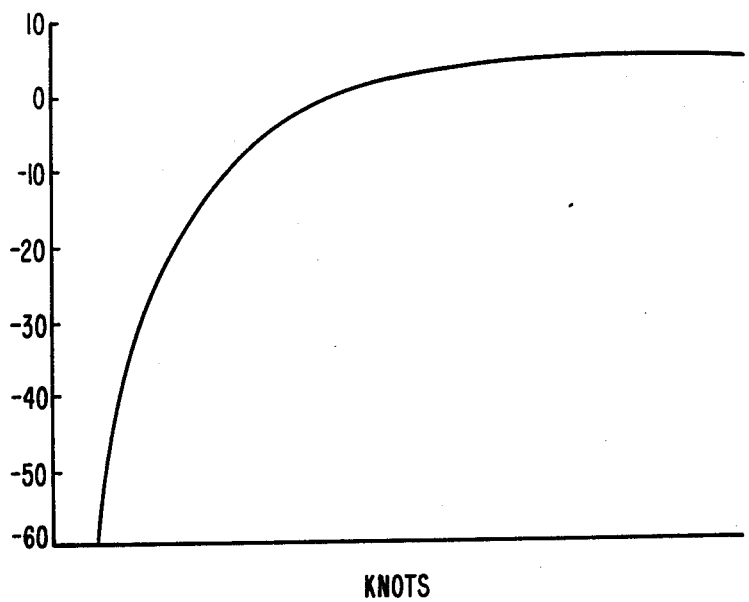
FIGS. 6A–7B illustrate the first time and second time around clutter cancellation for different sets of pulse weights.
Figure 6B:
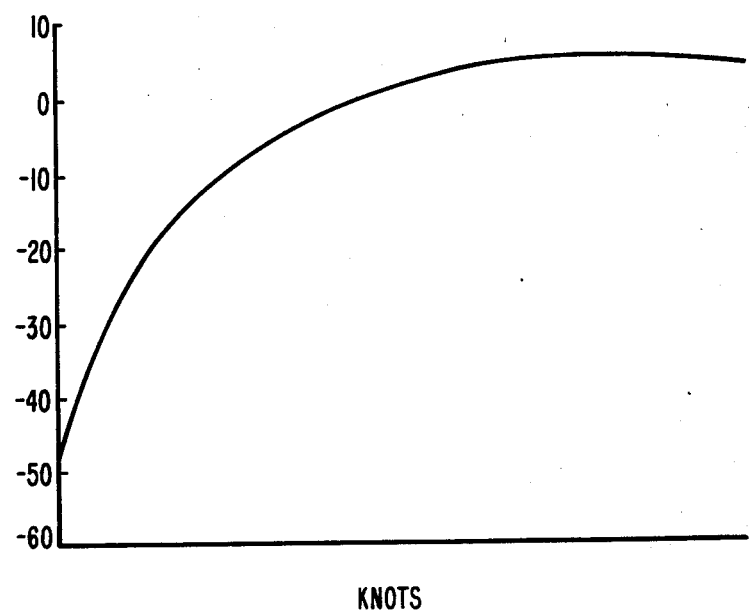

FIGS. 6A and 6B illustrate the first and second time around clutter cancellation produced when the power values of the weights in dB down from a reference are W1=29.55, W2=29.73, W3=15.97, W4=9.67, W5=8.64, W6=14.73, W7=33.97 and W8=0.58 which translates into real and imaginary component weights approximately equal to: W1=($-0.136E-1$, $0.3E-1$), W2=($0.131E-1$, $-0.3E-1$), W3=($-0.42E-1$, $-15$), W4=($-0.25$, $0.21$), W5=($-0.37$, $0.16E-1$), W6=($0.165$, $0.81E-1$), W7=($-112E-1$, $0.165E-1$), and W8=($-113E-1$, $0.176E-1$). If we use a typical single complex weight such as W1=$0.136E-1$, $0.3E-1$ the output signals are achieved by multiplying the I-input signal by $-0.136E-1$ and the Q-input signal by $0.3E-1$. The multiplied signal values are accumulated for the eight pulses and the addition of these two accumulated signals produces the I-channel output. Similarly, the Q-channel output is produced by multiplying the Q-input by $-0.136E-1$, multiplying the I-input by $-0.136E-1$, and accumulating and adding the signal values. The final output of one filter is produced by summing the squares of the I and Q-channel outputs. The I-output of a second filter is achieved by multiplying the I-input signal by $-0.136E-1$ and the Q-input signal by $-0.3E-1$. The Q-output of the second filter is produced by multiplying the Q-input signal by -$136E-1$ and the I-input signal by $0.3E-1$. The frequency response of the first and second filters is not symmetrical around zero, however, the outputs are mirror images of each other. Detection of targets is achieved by each of these filters individually and the composite coverage of both of the filters is symmetrical around zero.

Figure 7A:
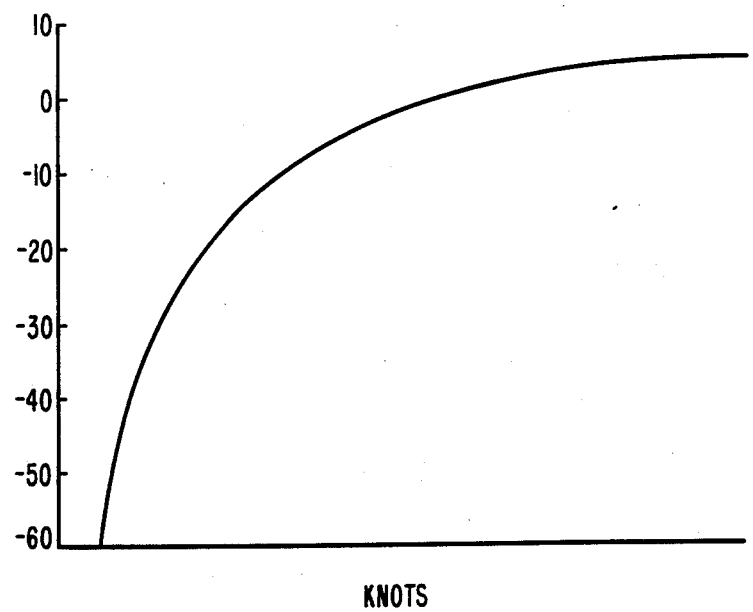
Figure 7B:
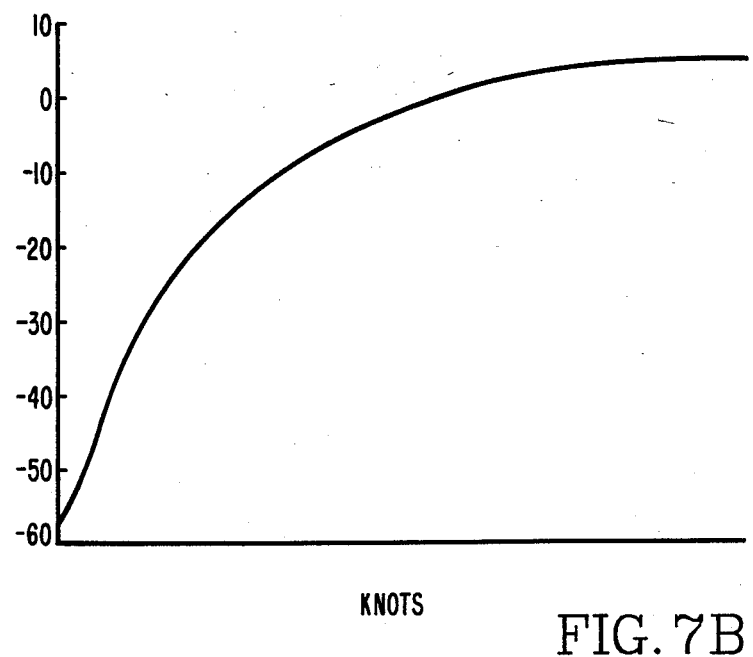

FIGS. 7B and 7C respectively illustrate first and second time around clutter cancellation when the power values of the weights in dB down from a reference of zero are $W1=43.06$, $W2=43.05$, $W3=17.82$, $W4=8.50$, $W5=8.27$, $W6=17.21$, $W7=45.82$, and $W8=45.43$ which translates into real and imaginary component weights approximately equal to: $W1=(-275E-2, 0.674E-2)$, $W2=(0.265E-2, -0.635E-2)$, $We=(-0.1, -0.757E-1)$, $W4=(0.34, 0.157)$, $W5=(0.37, -0.916E-1)$, $W6=(0.137, 0.876E-2)$, $W7=(0.293E-2, -0.419E-2)$, and $W8=-0.298E-2, 0.445E-2)$.

As can be seen when the power weight values on the outside pulses are greater (FIGS. 6A and 6B), the first time around clutter cancellation (FIGS. 6A) is better while the second time around clutter (FIGS. 6B) degrades. When the power weight values for the outer pulses are decreased (FIGS. 7A and 7B), the first time around clutter degrades (FIG. 7A) and the second time around clutter cancellation improves (FIG. 7B). By decreasing the outside pulse weights, the second time around clutter cancellation is improved with a consequent loss in first time around clutter cancellation effectiveness, thereby allowing tuning for clutter cancellation effects.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling within the scope of the invention. For example, the system could use six pulses for each pulse repetition frequency group and the three pulses from the preceding and succeeding groups in the clutter cancellation group. It is also possible to adjust the weights from azimuth cell to azimuth cell, if particular clutter has been identified and should be eliminated, by substituting a read only memory for the register 42 and providing an azimuth cell counter controlling memory output.

What is claimed is:

1. A clutter cancellation system, comprising:
   means for transmitting groups of radar pulses with different pulse repetition frequencies from group to group and receiving groups of return pulses; and
   clutter cancellation means for avoiding occurrence of blind target speeds and cancelling first and second time around clutter by weighting and accumulating the groups of the return pulses.

2. A system as recited in claim 1, wherein said clutter cancellation means comprises:
   weighting means for multiplying each return pulse in the group by a different weight producing weighted pulses; and
   accumulating means for adding the weighted pulses to produce an output.

3. A clutter cancellation system, comprising:
   means for transmitting variable interpulse period radar pulses and receiving return pulses; and
   clutter cancellation means for weighting and accumulating a group of the return pulses where the group of return pulses includes two pulses from a first pulse repetition frequency pulse group, all pulses from a second pulse repetition frequency group two pulses from a third pulse repetition frequency group and where an interpulse period for each of the pulse repetition frequency groups is different.

4. A system as recited in claim 2, wherein said weighting means comprises:
   a register storing the different weights; and
   a multiplier, connected to said means for transmitting and receiving and to said register, for producing the weighted pulses.

5. A system as recited in claim 2, wherein said accumulating means comprises:
   an adder, connected to said weighting means, for adding the weighted pulses; and
   a register, connected to said adder, for storing interim accumulation results.

6. A clutter cancellation system comprising:
   means for transmitting three transmit groups of pulse repetition frequency pulses with a differing interpulse period from group to group and receiving a return group of return pulses from the three transmit groups:
   a first register storing a different weight for each pulse in the return group;
   a multiplier, connected to said means for transmitting and receiving and to said first register, for multiplying each pulse by one of the different weights;
   an adder, connected to said multiplier, for adding each multiplied pulse to a prior interim result to produce a current interim result; and
   a second register, connected to said adder, for producing the prior interim result and storing the current interim result.

7. A system as recited in claim 3, wherein an absolute value of the weights produces a symmetric curve.

8. A method of clutter cancellation, comprising the steps of:
   (a) transmitting groups of radar pulses with different pulse repetition frequencies from group to group and receiving a group of return pulses;
   (b) multiplying the pulses of the group of the return pulses by different weights; and
   (c) adding the weighted return pulses in the group of the return pulses.

9. A method of clutter cancellation, comprising the steps of:
   (a) transmitting variable interpulse period radar pulses and receiving return pulses;
   (b) multiplying a group of the return pulses by different weights, where the group of return pulses includes two pulses from a first pulse repetition frequency pulse group, all pulses from a second pulse repetition frequency group and two pulses from a third pulse repetition frequency group and where an interpulse period for each of the pulse repetition frequency groups is different; and
   (c) adding the weighted return pulses in the group.

* * * * *